US008965995B2

(12) United States Patent
Kuo

(10) Patent No.: US 8,965,995 B2
(45) Date of Patent: Feb. 24, 2015

(54) WIRELESS STORAGE MANAGEMENT SYSTEM

(75) Inventor: Chih-Jen Kuo, New Taipei (TW)

(73) Assignee: Cheng Uei Precision Industry Co., Ltd., New Taipei (TW)

(*) Notice: Subject to any disclaimer, the term of this patent is extended or adjusted under 35 U.S.C. 154(b) by 425 days.

(21) Appl. No.: 13/572,837

(22) Filed: Aug. 13, 2012

(65) Prior Publication Data

US 2014/0047057 A1 Feb. 13, 2014

(51) Int. Cl.
G06F 15/16 (2006.01)
H04L 29/08 (2006.01)

(52) U.S. Cl.
CPC .... H04L 29/08549 (2013.01); H04L 29/08702 (2013.01); Y10S 707/99933 (2013.01)
USPC .......... 709/211; 711/137; 711/202; 711/141; 711/119; 711/204; 707/E17.108; 707/E17.12; 707/999.003

(58) Field of Classification Search
CPC ................... H04L 29/08549; H04L 29/08702
See application file for complete search history.

(56) References Cited

U.S. PATENT DOCUMENTS

| 7,801,150 | B1* | 9/2010 | Rupavatharam | 370/395.32 |
| 2007/0150450 | A1* | 6/2007 | Murase | 707/3 |
| 2009/0112563 | A1* | 4/2009 | Drerup | 703/21 |
| 2010/0007768 | A1* | 1/2010 | Yong et al. | 348/231.9 |
| 2014/0019651 | A1* | 1/2014 | Ben-Harosh | 710/63 |

* cited by examiner

Primary Examiner — Arvin Eskandarnia
(74) Attorney, Agent, or Firm — Lin & Associates IP, Inc.

(57) ABSTRACT

A wireless storage management system adapted for being used in an electronic product for wirelessly communicating with a plurality of wireless storage devices includes an identity module assigning master and slave roles to the wireless storage devices, a hard disk manage module controlling the master device to obtain disk information about the wireless storage devices and further set an archive order for the slave devices, and a file manage module managing file access according to the archive order. The electronic product is only directly connected with the master device to make the hard disk manage module and the file manage module manage the slave devices via the master device. So the electronic product can conveniently view the disk information of all of the wireless storage devices and further realize the file access to all of the devices only by being directly connected with the master device.

6 Claims, 3 Drawing Sheets

WIRELESS STORAGE MANAGEMENT SYSTEM

BACKGROUND OF THE INVENTION

1. Field of the Invention

The present invention generally relates to a storage management system, and more particularly to a wireless storage management system.

2. The Related Art

At present, the emergence and development of cloud technology and consumer electronics (such as smart phones) inspire a flood of peripheral related products, and a wireless storage device (such as Wi-Fi hard disk) is one of them. People may use the consumer electronics to download some files, such as music, videos and so on. However, self storage space of the consumer electronics often fails to meet the requirement of storing large amounts of files. So the wireless storage device came with the tide of fashion. When larger amounts of files need to be stored, two or more wireless storage devices will be used.

However, during using the above-mentioned two or more wireless storage devices, when the wireless storage device in use is out of disk space or some files will be searched, a replacement operation will be manually performed among the wireless storage devices for selecting the appropriate wireless storage device. It causes an inconvenience for the user.

SUMMARY OF THE INVENTION

An object of the present invention is to provide a wireless storage management system which is adapted for being used in an electronic product for wirelessly communicating with a plurality of wireless storage devices. The wireless storage devices are wirelessly connected with one another through Local Area Network. The wireless storage management system includes an identity module, a hard disk manage module and a file manage module.

The identity module assigns roles to the wireless storage devices connected with the electronic product, of which one is designated as a master device and the rest are designated as slave devices. Then the electronic product is only directly connected with the master device. The master device communicates with the electronic product and the slave devices, and the slave devices simply respond to instructions sent by the master device. The hard disk manage module controls the master device to obtain disk information about the wireless storage devices, and further set an archive order for the slave devices. The hard disk manage module divides the disk space of the master device into a storage space for storing files and a cache space playing a part in the process of the master device accessing files. The file manage module controls the master device to store files into one proper slave device through the cache space of the master device when the rest of the storage space in the master device is insufficient to store the files. According to the archive order set for the slave devices by the hard disk manage module, the master device successfully judges whether the rest of the storage space of the slave device is sufficient to store the files so as to select the proper slave device having sufficient storage space. When the electronic product reads needed files, if the directory that the needed files are in is not in the master device, the file manage module finds the slave device where the needed files are, and the master device extracts the needed files from the found slave device into the cache space thereof and then sends the needed files to the electronic product.

As described above, the wireless storage management system of the present invention utilizes the identity module to assign the master and slave roles to the wireless storage devices. Then the electronic product is only connected with the master device to make the hard disk manage module and the file manage module manage the slave devices via the master device. So the electronic product can conveniently view the disk information of all of the wireless storage devices and further realize the file access to all of the devices only by being directly connected with the master device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
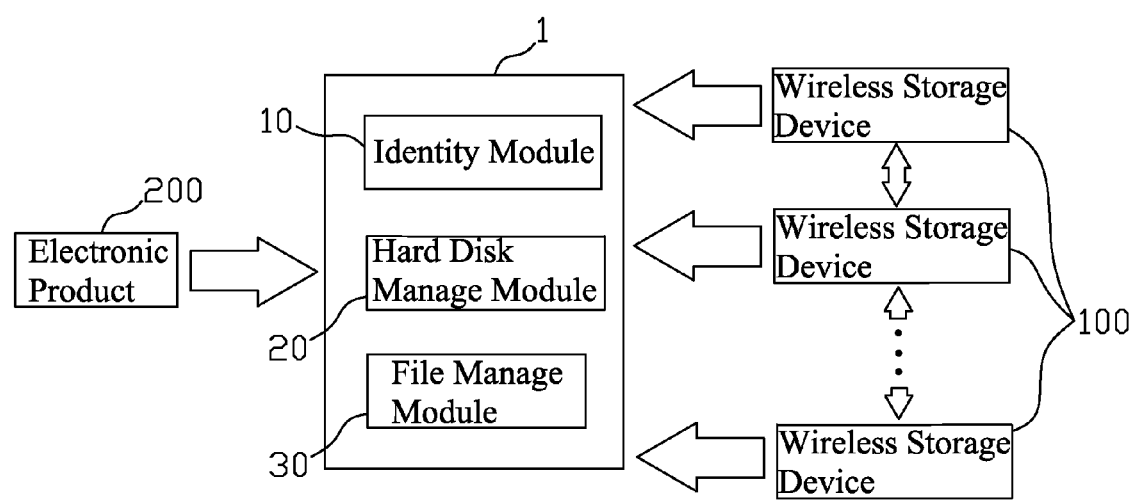
FIG. 1 is a block diagram of a wireless storage management system according to the present invention.

Referring to FIG. 1, a wireless storage management system 1 according to the present invention is mainly used in an electronic product 200 for wirelessly communicating with a plurality of wireless storage devices 100, wherein the wireless storage devices 100 are wirelessly connected with one another through LAN (Local Area Network). The wireless storage management system 1 includes an identity module 10, a hard disk manage module 20 and a file manage module 30.

The identity module 10 assigns roles to the wireless storage devices 100, of which one is designated as a master device and the rest are designated as slave devices. Then the electronic product 200 is only directly connected with the master device. The master device communicates with the electronic product 200 and the slave devices, and the slave devices simply respond to instructions sent by the master device. Moreover, the identity module 10 has an ability of identifying the master and slave roles of the wireless storage devices 100.

The hard disk manage module 20 controls the master device to obtain disk information about the wireless storage devices 100, such as quantities and total storage space size of the wireless storage devices 100 currently connected with the electronic product 200, and further to set an archive order for the slave devices. The hard disk manage module 20 divides the disk space of the master device into a storage space for storing files and a cache space playing a part in the process of the master device accessing files.

The file manage module 30 controls the master device to store files into one proper slave device through the cache space of the master device, when the rest of the storage space in the master device is insufficient to store the files. In detail, according to the archive order set for the slave devices by the hard disk manage module 20, the master device judges whether the rest of the storage space of the slave device is sufficient to store the files. If it is insufficient, next slave device will be judged. And so on, until the proper slave device having sufficient storage space is selected to store the files. When the electronic product 200 reads needed files, if the directory that the needed files are in is not in the master device, the file manage module 30 will find the slave device where the needed files are, and the master device extracts the needed files from the found slave device into the cache space thereof and then sends the needed files to the electronic product 200. Furthermore, the file manage module 30 is capable of controlling the master device to move the stored files among the wireless storage devices 100.

In use, the electronic product 200 can conveniently view the total storage space size of all of the wireless storage devices 100 only by being directly connected with the master device, and can conveniently realize the file access to all of the slave devices only via the master device.

Figure 2:
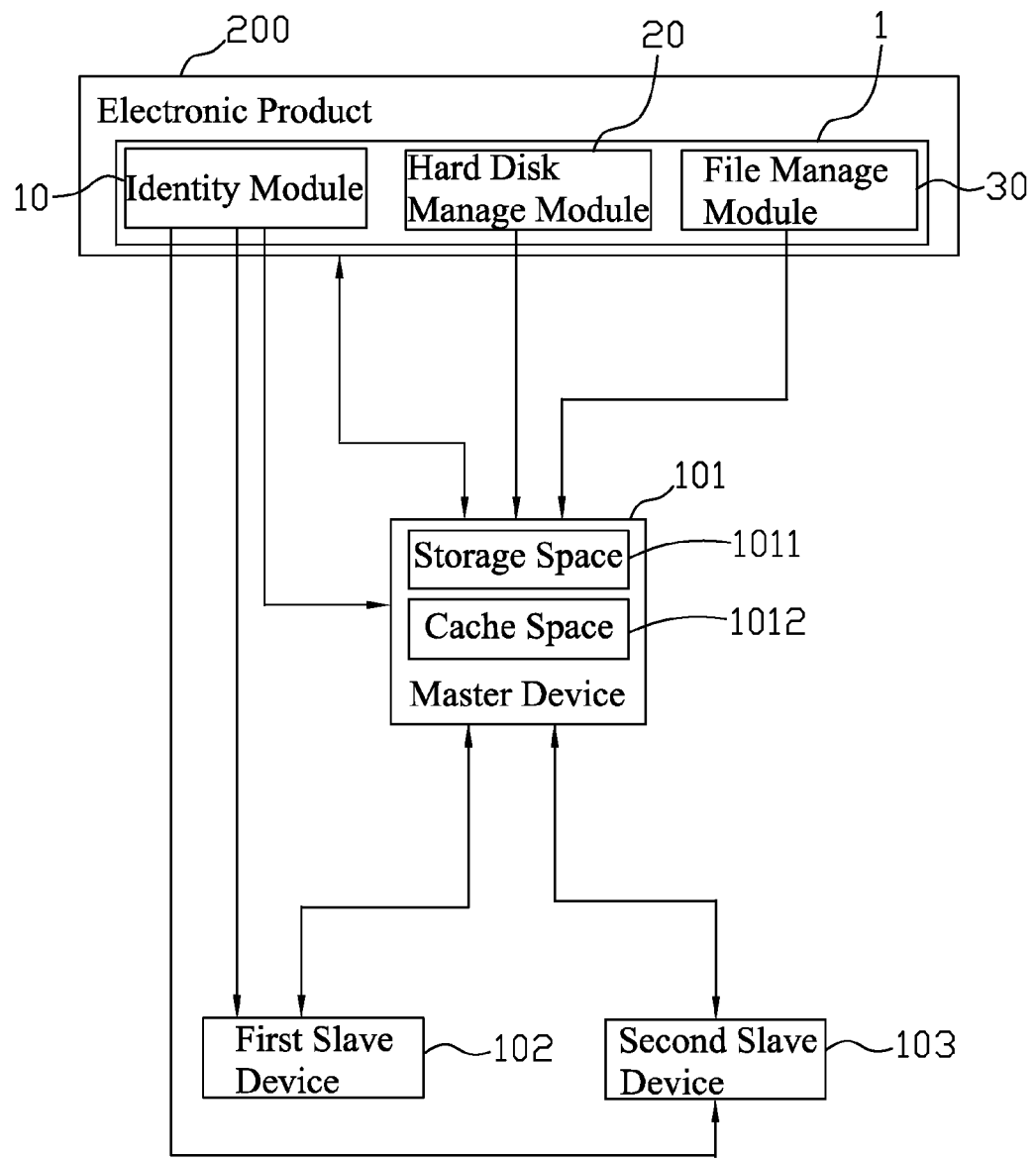
FIG. 2 is a work block diagram of one embodiment of the wireless storage management system of FIG. 1.
Figure 3:
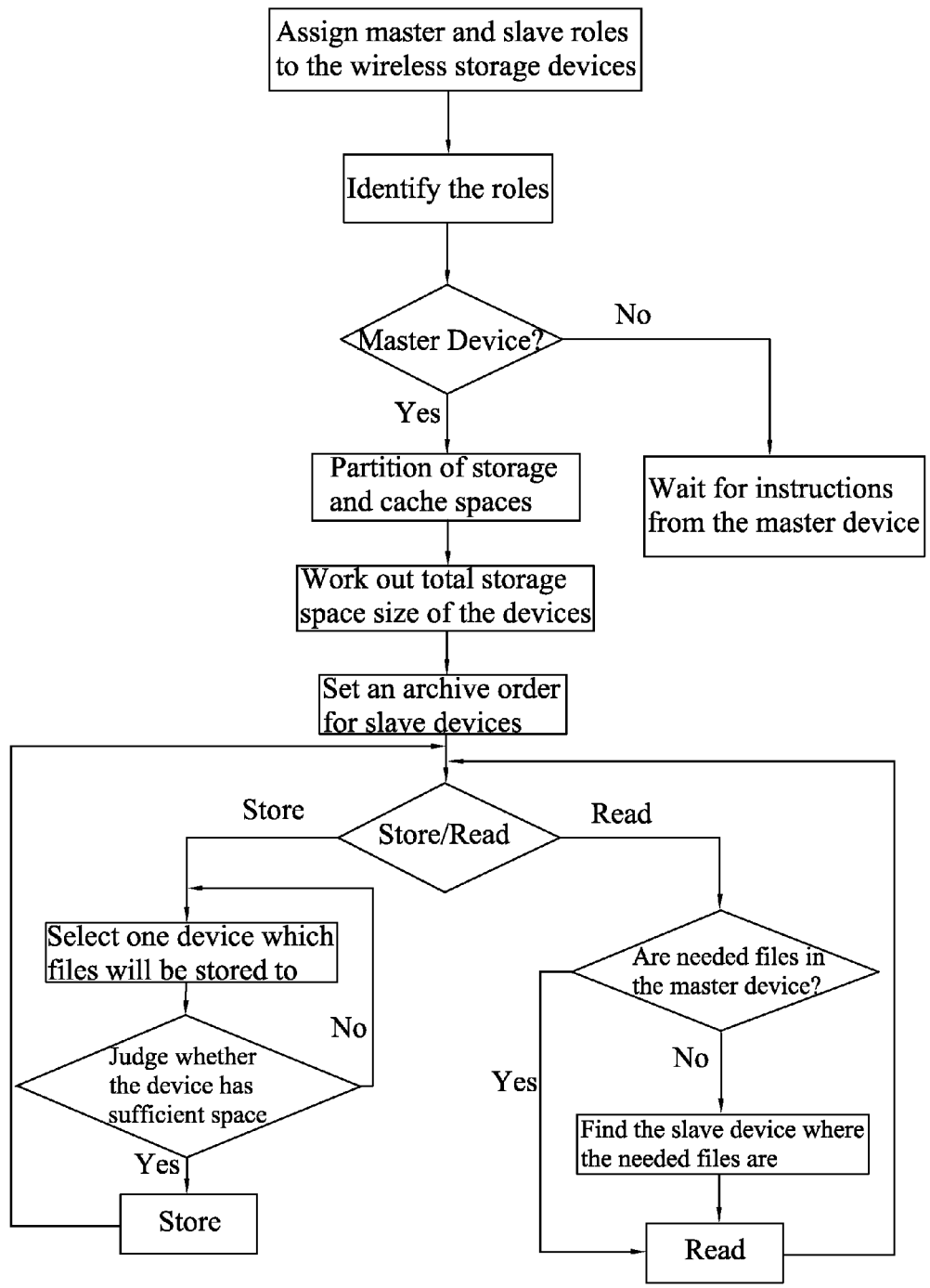
FIG. 3 is a work flow diagram of the wireless storage management system of the present invention.

Referring to FIG. 2 and FIG. 3, one unlimited embodiment is introduced for describing the above in detail. In the unlimited embodiment, the electronic product 200 utilizes the identity module 10 to designate the wireless storage devices 100 as one master device 101, a first slave device 102 and a second slave device 103, wherein the wireless storage devices 100 each is a hard disk with a wireless connection of Wi-Fi. Further, to increase quantities of the slave devices, it will be done that only connecting new wireless storage devices 100 to the LAN where the master device 101 and the two slave devices 102, 103 are wirelessly connected.

Then, the electronic product 200 is only connected with the master device 101 to obtain the total storage space size of the master device 101 and the two slave devices 102, 103, and further indirectly access files to the two slave devices 102, 103 via the master device 101. In detail, the hard disk manage module 20 divides the disk space of the master device 101 into a storage space 1011 and a cache space 1012, then obtains the disk information about the two slave devices 102, 103 via the master device 101 to work out the total storage space size of the devices 101, 102, 103, and further sets an archive order for the two slave devices 102, 103. In the unlimited embodiment, it is the prioritization of the first slave device 102 over the second slave device 103, and the first slave device 102 has a smaller storage space than that of the second slave device 103.

When some files need to be stored by the electronic product 200, the files are firstly stored into the storage space 1011 of the master device 101. If the rest of the storage space 1011 of the master device 101 is insufficient, the master device 101 stores the files into the first slave device 102 through the cache space 1012 of the master device 101 according to the archive order. At this moment, the master device 101 judges whether the rest of the storage space of the first slave device 102 is sufficient to store the files. If it is insufficient or the file size is greater than the rest storage space of the first slave device 102, the files are stored into the second slave device 103 by the master device 101.

When the electronic product 200 reads needed files, if the directory that the needed files are in is not in the master device 101, the file manage module 30 will find the first slave device 102 or the second slave device 103 where the needed files are, and the master device 101 extracts the needed files from the found slave device 102/103 into the cache space 1012 thereof and then sends the needed files to the electronic product 200.

As described above, the wireless storage management system 1 of the present invention utilizes the identity module 10 to assign the master and slave roles to the wireless storage devices 100. Then the electronic product 200 is only connected with the master device to make the hard disk manage module 20 and the file manage module 30 manage the slave devices via the master device. So the electronic product 200 can conveniently view the disk information of all of the wireless storage devices 100 and further realize the file access to all of the devices 100 only by being directly connected with the master device.

What is claimed is:

1. A wireless storage management system adapted for being used in an electronic product for wirelessly communicating with a plurality of wireless storage devices, the wireless storage devices being wirelessly connected with one another through Local Area Network, the wireless storage management system comprising:

an identity module assigning roles to the wireless storage devices connected with the electronic product, of which one is designated as a master device and the rest are designated as slave devices, then the electronic product being only directly connected with the master device, the master device communicating with the electronic product and the slave devices, the slave devices simply responding to instructions sent by the master device;

a hard disk manage module controlling the master device to obtain disk information about the wireless storage devices, and further set an archive order for the slave devices, the hard disk manage module dividing the disk space of the master device into a storage space for storing files and a cache space playing a part in the process of the master device accessing files; and a file manage module controlling the master device to store files into one proper slave device through the cache space of the master device when the rest of the storage space in the master device is insufficient to store the files, wherein according to the archive order set for the slave devices by the hard disk manage module, the master device successfully judges whether the rest of the storage space of the slave device is sufficient to store the files so as to select the proper slave device having sufficient storage space, when the electronic product reads needed files, if the directory that the needed files are not in the master device, the file manage module finds the slave device where the needed files are, and the master device extracts the needed files from the found slave device into the cache space thereof and then sends the needed files to the electronic product.

2. The wireless storage management system as claimed in claim 1, wherein the wireless storage devices each is a hard disk with a wireless connection of Wi-Fi.

3. The wireless storage management system as claimed in claim 1, wherein the identity module has an ability of identifying the master and slave roles of the wireless storage devices.

4. The wireless storage management system as claimed in claim 1, wherein the hard disk manage module can view quantities and total storage space size of all of the wireless storage devices only via the master device.

5. The wireless storage management system as claimed in claim 1, wherein the file manage module is capable of controlling the master device to move the stored files among the wireless storage devices.

6. The wireless storage management system as claimed in claim 1, wherein to increase quantities of the slave devices, it will be done that only connecting new wireless storage devices to the Local Area Network where the master device and the slave devices are wirelessly connected.

\* \* \* \* \*